United States Patent Office 2,732,201
Patented Jan. 24, 1956

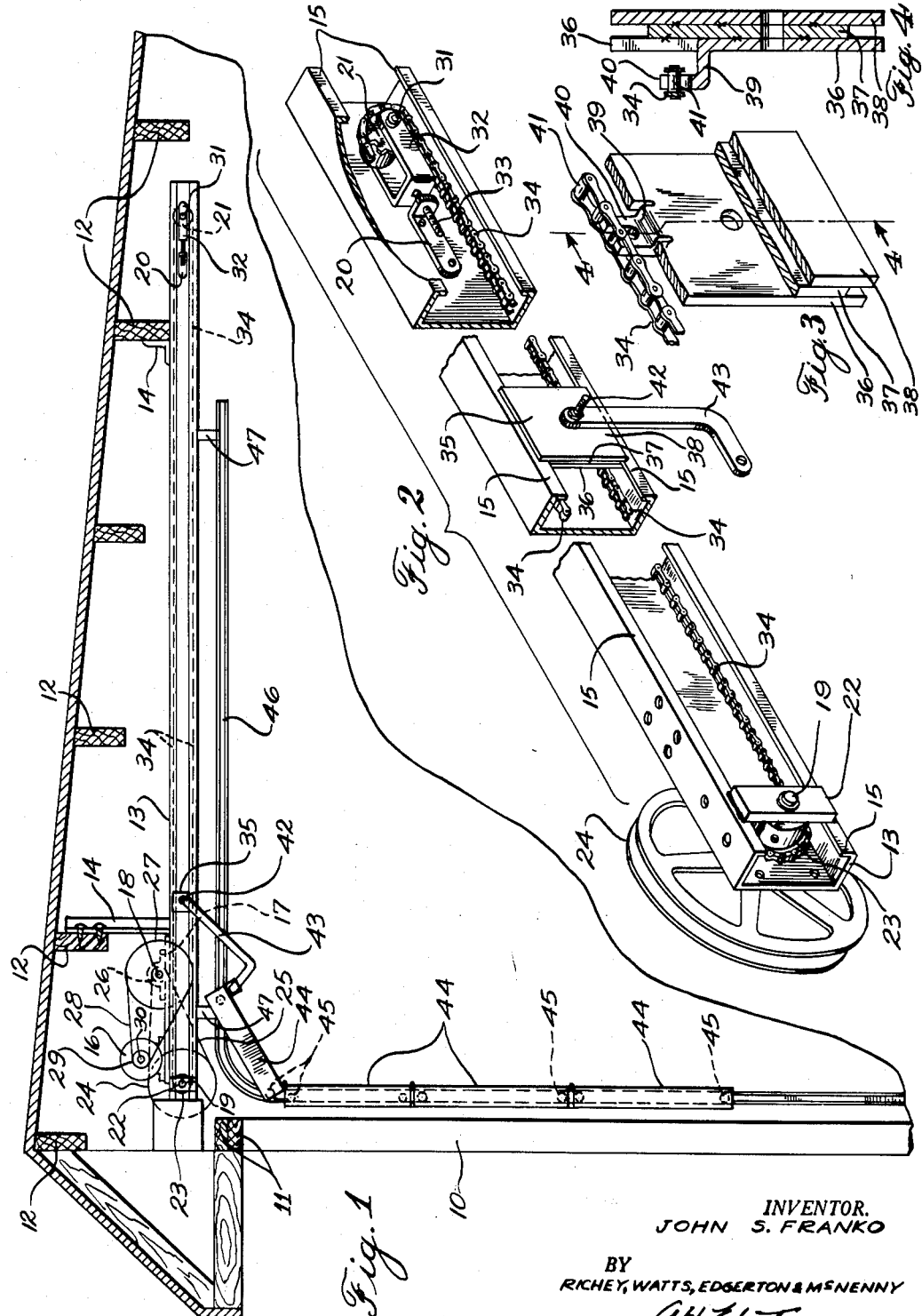

2,732,201

DOOR OPERATING MECHANISM

John S. Franko, Cleveland, Ohio

Application January 19, 1955, Serial No. 482,793

3 Claims. (Cl. 268—59)

This invention relates broadly to door operating devices and more specifically to improvements in the structure and organization of the power actuating mechanism for elevating garage doors and the like.

One of the objects of the invention resides in the provision of an improved track to support the chain and traveler associated with the door actuating linkage.

Another object of the invention is to provide a coupling between the chain and traveler to facilitate adjustment of the latter with ease and dispatch.

Another object of the invention is to provide a power transmission assembly and motor support which is compact, readily accessible for adjustment and repair and economic of manufacture.

Referring to the drawings:

Fig. 1 is a vertical sectional view of a fragmentary portion of a building structure illustrating the improved door operating mechanism mounted therein.

Fig. 2 is a view in perspective of the track, chain, and traveler assembly, portions of the track and chain being broken away and the motor and jouranal bearing for one of the sheave wheels being removed, in the interest of clarity.

Fig. 3 is a view in perspective of the traveler assembly, the upper portion, thereof, being broken away in order to show the construction of the inner plate and chain coupling.

Fig. 4 is a vertical section through the center of the traveler the section being taken on a plane indicated by the line 4—4 in Fig. 3.

Referring first to Fig. 1 the building, which has been merely chosen for the purpose of illustration, embodies the usual framing members including the vertical studs 10, door headers 11, roof rafters 12 and sheathing of conventional form. As shown, the track 13 is supported by hangers 14 attached to certain of the rafters 12 though obviously similar hangers or brackets, secured to floor joist may be used in building structures framed with a second floor or a ceiling.

The track 13 comprises a channel iron formed with opposed inwardly directed ribs 15 on the marginal edges of the flanged portions, thereof, and the upper flange of the channel is fabricated to accommodate the support of an electrical motor 16 and a journal bearing block 17 for a countershaft 18. The web of the channel is drilled to receive a sprocket shaft 19 and a bracket 20 which provides an adjustable support for an idler sprocket 21. The shaft 19 is further retained by plate 22 welded to the outer faces of the ribs 15 of the channel iron, the plate being drilled and line reamed with the opening in the web of the channel to assure alignment of the journal bearings. The shaft 19 supports a chain sprocket 23 within the channel and an outbored pulley 24 for the V-belt 25, connected to a pulley 26 on the countershaft 18. The outer end of the shaft 18 is provided with a pulley 27 to receive a V-belt 28 coupled with a pulley 29 entrained with a pulley on the armature shaft 30 of the motor 17.

The idler sprocket 21 is mounted on a shaft 31 supported in a yoke 32 having a threaded stud 33 affixed to the closed end, thereof, which is engaged in a tapped opening in a lateral extension of the bracket 20. An endless link belt or chain 34 is roved over the sprockets 23 and 21 tension of the chain being facilitated by adjustment of the threaded stud 33 within the bracket 20.

A traveler 35 is mounted for sliding movement over the ribs 15, the traveler comprising a back plate 36 an intermediate plate 37 and a front or outer plate 38. The back plate 36 is pierced and formed to provide a lateral arm 39 (Fig. 4) having an upwardly directed yoked end portion 40 adapted for engagement with one of the cross pins 41 in the chain 37. The upper and lower edges of the front and back plates 38 and 36 are formed to overlie the ribs 15 in the channel iron while the intermediate plate 37 is formed with a running clearance over the edges of the ribs 15. The plates are welted or otherwise attached to each other to form an integral unit and the central portion, thereof, is bored for the reception of a pintle 42 constituting the fulcrum for an arm 43 connected to the uppermost section of an articulated door 44. The door sections are constructed in the usual manner including rollers 45 mounted in a channeled guide way 46 suspended by hangers 47 from the channel iron track 15.

In operation the motor 16 is energized by a switch, (not shown), generally mounted on a post or building structure disposed in remote relation to the door. The motor is of the reversible type and the chain is provided with lugs to trip the reversing mechanism at the end of the upward or downward flight of the door. As the motor is operated the pulleys 27 and belts rotate the sprocket 23 and thus effect the movement of the chain 34 and the consequent translation of the traveler 35 coupled thereto. In the event the door is not fully opened or closed during the initial installation of the operating mechanism, the upper strand of the chain may be lifted and a contiguous cross pin in the 44 chain reseated in the yoke 40 to effect the proper position of the traveler, relative to the door and arm 43.

It will be recognized that the double flanged structure of the channel provides a track which is light in weight yet rigid and straight and that the upper face of the channel provides an adequate support for the base of the motor and the bearing block 17. It will be further recognized that the construction of the power transmission assembly may be economically constructed and is readily accessible for adjustment and repair.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An overhead door assembly comprising the combination with a door having hinged panels, a track for guiding the ends of said panels from a vertical position in which the door is closed to a horizontal overhead position in which the door is open, a channel superjacent the horizontal portion of said track, inwardly directed ledges disposed in a common vertical plane in spaced relation with each other on the horizontal flanges of said channel, a vertical plate intermediate and slidably engaged with the confronting edges of said ledges, forward and rearward cover plates affixed to the first named plate and arranged with the top and bottom edges thereof in overlapped sliding relation with the faces of said ledges, a vertically disposed tongue on the rearward cover plate, a yoke in the top thereof, a chain in said channel, the tines of said yoke being engaged with one of the cross pins in said chain, and an arm pivotally connected to said plates and to the top panel of the door for raising and lowering the door upon operation of said chain.

2. An overhead door assembly comprising the combination with a door having hinged panels, a track for guiding the ends of said panels from a vertical position in which the door is closed to a horizontal overhead position in which the door is open, a channel superjacent the horizontal portion of said track, a sprocket wheel mounted in each end of said channel, a motor mounted on the top of said channel driving connections between said motor and one of said sprockets, an endless chain on said sprockets, an adjusting mechanism in said channel for horizontal movement of the other of said sprockets, inwardly directed ledges disposed in a common vertical plane in spaced relation with each other on the horizontal flanges of said channel, a vertical plate intermediate and slidably engaged with the confronting edges of said ledges, forward and rearward cover plates affixed to the first named plate and arranged with the top and bottom edges thereof in overlapped sliding relation with the faces of said ledges, a vertically disposed tongue on the rearward cover plate, a yoke in the top thereof engaged with one of the cross pins in said chain, and an arm pivotally connected to said plates and to the top panel of the door for raising and lowering the door upon operation of said chain.

3. An overhead door assembly comprising the combination with a door having hinged panels, a track for guiding the ends of said panels from a vertical position in which the door is closed to a horizontal overhead position in which the door is open, a channel superjacent the horizontal portion of said track, a sprocket in said channel, a motor on the top of said channel, driving connections between said motor and said sprocket, a bracket in said channel in the end thereof opposite said sprocket, a yoke screw threaded to said bracket, a second sprocket in said yoke, an endless chain on said sprockets, inwardly directed ledges disposed in a common vertical plane in spaced relation with each other on the horizontal flanges of said channel, a vertical plate intermediate and slidably engaged with the confronting edges of said ledges, forward and rearward cover plates affixed to the first named plate and arranged with the top and bottom edges thereof in overlapped sliding relation with the faces of said ledges, a vertically disposed tongue on the rearward cover plate, a yoke in the top thereof engaged with one of the cross pins in said chain, and an arm pivotally connected to said plates and to the top panel of the door for raising and lowering the door upon operation of said chain.

References Cited in the file of this patent

UNITED STATES PATENTS

| | | |
|---|---|---|
| 1,222,090 | Findlay | Apr. 10, 1917 |
| 1,661,719 | Edwards et al. | Mar. 6, 1928 |
| 1,962,475 | Blodgett | June 12, 1934 |
| 2,309,984 | Rogers | Feb. 2, 1943 |
| 2,544,239 | Schirmer | Mar. 6, 1951 |
| 2,690,908 | Coit | Oct. 5, 1954 |